E. S. SCRIPTURE,

Assignor, by mesne assignments, to W. S. REED.

Carriage-Top.

No. 9,230. Reissued June 1, 1880.

*Witnesses:*
Jos P. Livermore
L. F. O'Connor

*Inventor:*
Eliphalet S. Scripture,
by Crosby & Gregory Atty

N. PETERS, PHOTO-LITHOGRAPHER, WASHINGTON, D. C.

UNITED STATES PATENT OFFICE.

ELIPHALET S. SCRIPTURE, OF BROOKLYN, NEW YORK, ASSIGNOR, BY MESNE ASSIGNMENTS, TO W. S. REED, OF LEOMINSTER, MASSACHUSETTS.

CARRIAGE-TOP.

SPECIFICATION forming part of Reissued Letters Patent No. 9,230, dated June 1, 1880.

Original No. 78,836, dated June 9, 1868. Application for reissue filed October 9, 1879.

*To all whom it may concern:*

Be it known that I, ELIPHALET S. SCRIPTURE, of Brooklyn, Kings county, New York, have invented certain new and useful Improvements in Carriage-Tops, for the convenient mode of constructing, handling, managing, and governing the same; and the following is declared to be a full, clear, and correct description of the said invention, reference being had to the accompanying drawings, making part of this specification, and to the letters of reference marked thereon, in which—

Figure 1:
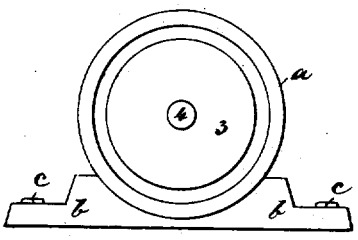
Figure 3:
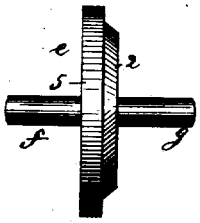
Figure 2:
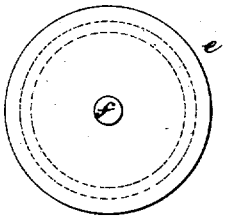
Figure 5:
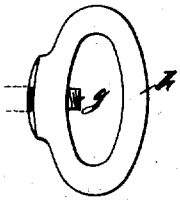
Figure 4:
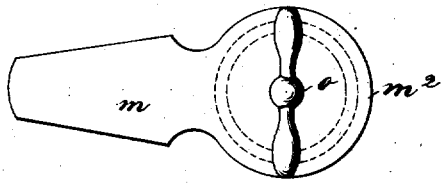

Figure 1 shows a side elevation of the inner disk of the female half of the main or bow joint with its standard or base; Fig. 2, the same view of the same; Fig. 3, an end view of the male half with its horizontal bolt or shaft passing through; Fig. 4, a flat view of one-half of the extension-joint; Fig. 5, a side elevation of the handle-nut to the main joint, and Fig. 6 a perspective elevation of the seat and top.

In the drawings like parts of the invention are designated by the same letters of reference.

The nature of my invention consists in the use or employment of circular friction-surfaces, constructed as hereinafter described, for the purpose of raising, lowering, controlling, and securing a carriage-top in the various forms and positions required.

The female half *a* of the main bow-joint has ears *b* to receive screws *c*, by which to attach the part *a* to the seat *d*. The movable male half *e* of the main bow-joint has a conical or truncated side, 2, to enter a correspondingly-shaped recess, 3, in the female half *a*. (See Fig. 1.) Extended through and fixed to the male part *e* is the shaft *f g*. The part *g* of the said shaft is extended through the hole 4 at the center of the female part *a*, and upon the end of the part *g* is screwed the nut *h*, the pressure or friction of the male part 2 against and in the recessed part 3 of the female part being regulated by means of this nut, so that the said main bow-joint will be held together by friction, and more or less power will be required to turn it and the carriage-top, the main bow *i* of which is attached to the outer surface, 5, of the male part *e*, the said bow being held by the part *f* of the shaft *f g* of the male part *e*, so as to turn with the said male part as it is permitted to rotate.

Figure 6:
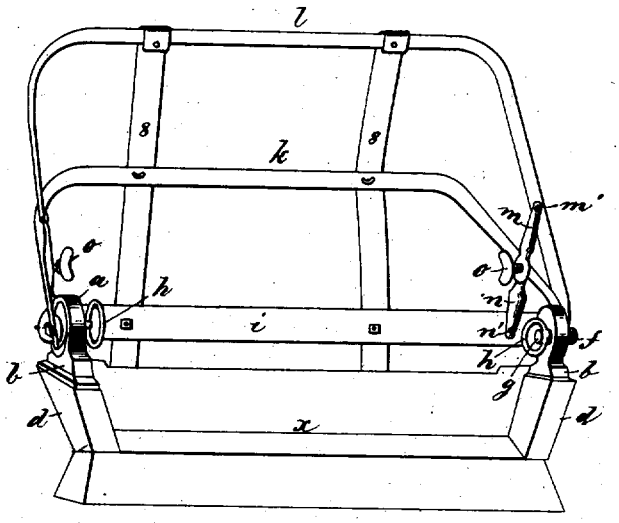

The middle bow, *k*, and front bow, *l*, connected by suitable straps 8 with the main bow *i*, are in Fig. 6 shown as moved away from the main bow as far as the straps 8 will permit, and the main bow is shown in its most backward position, with the top supposed to be thrown back.

When turning or moving the top into an upright position to cover the seat *x* the main bow will be lifted, and the male parts *e*, held in the female parts *a* by friction between their contacting faces by the screw and nut, will turn in the said female parts.

This friction-joint *a e* for the top and connecting the top and seat is very simple, cheap, and effective, and permits the top to be held in any position in which it may be placed with relation to the seat.

To keep the front and middle bows separated from the main bow at the proper distance, there is employed a joint-piece composed of the parts *m n*, *m* being connected at one end with the front bow at *m'*, and *n* with the main bow at *n'*, the two overlapping disk-like ends $m^2$ $n^2$ of *m n*, opposite the middle bow, being held together by the thumb-screw *o*. To drop the bows *k l*, loosen the thumb-screw *o*.

The top may be held in any adjusted position by drawing together the friction-disks *a e* by means of the thumb-screw or nut *h* screwed on the end *g* of shaft *f g*, as shown at the right of Fig. 6.

The main bow is firmly sustained and held in place by means of the powerful friction of the wedge-surfaces 3 2 of the parts *a e* of the main joint, said main joint being used as a substitute for the outside back braces usually found on carriage-tops. This main bow has also to sustain the other portions of the top in position.

The advantages possessed by this invention are, first, simplicity and small cost of construction, in view of the many and important results derived therefrom; second, greater strength when properly made; third, the readiness with which the whole top may be taken off and again replaced; and, fourth, the folds may be readily placed and firmly held at any chosen point while being operated from inside, thereby quickly laying back the front bows while another person gets into the seat, and as readily replaced thereafter.

I claim—

1. The combination, with a carriage top and seat, of friction-joints, substantially as described, interposed between the seat and top at both sides of the carriage, and adapted to support the weight of the top, to serve as the center about which the entire top turns when being raised or lowered, and to hold the top in adjusted position, substantially as set forth.

2. A carriage-top connected on both sides of the carriage and seat, in combination with friction-joints, each composed of a part, *a*, having a conical recess, 3, and ears *b*, and a part, *e*, having a conical face, 2, a shaft common to both parts, and a nut to crowd such parts together to hold the carriage-top at any desired elevation, substantially as specified.

ELIPHALET S. SCRIPTURE.

Witnesses:
CHAS. W. HOWELL,
JOHN ALLEN.